(No Model.)
T. HAYES.
PROCESS OF MAKING AND COOLING MASH.
No. 288,333. Patented Nov. 13, 1883.
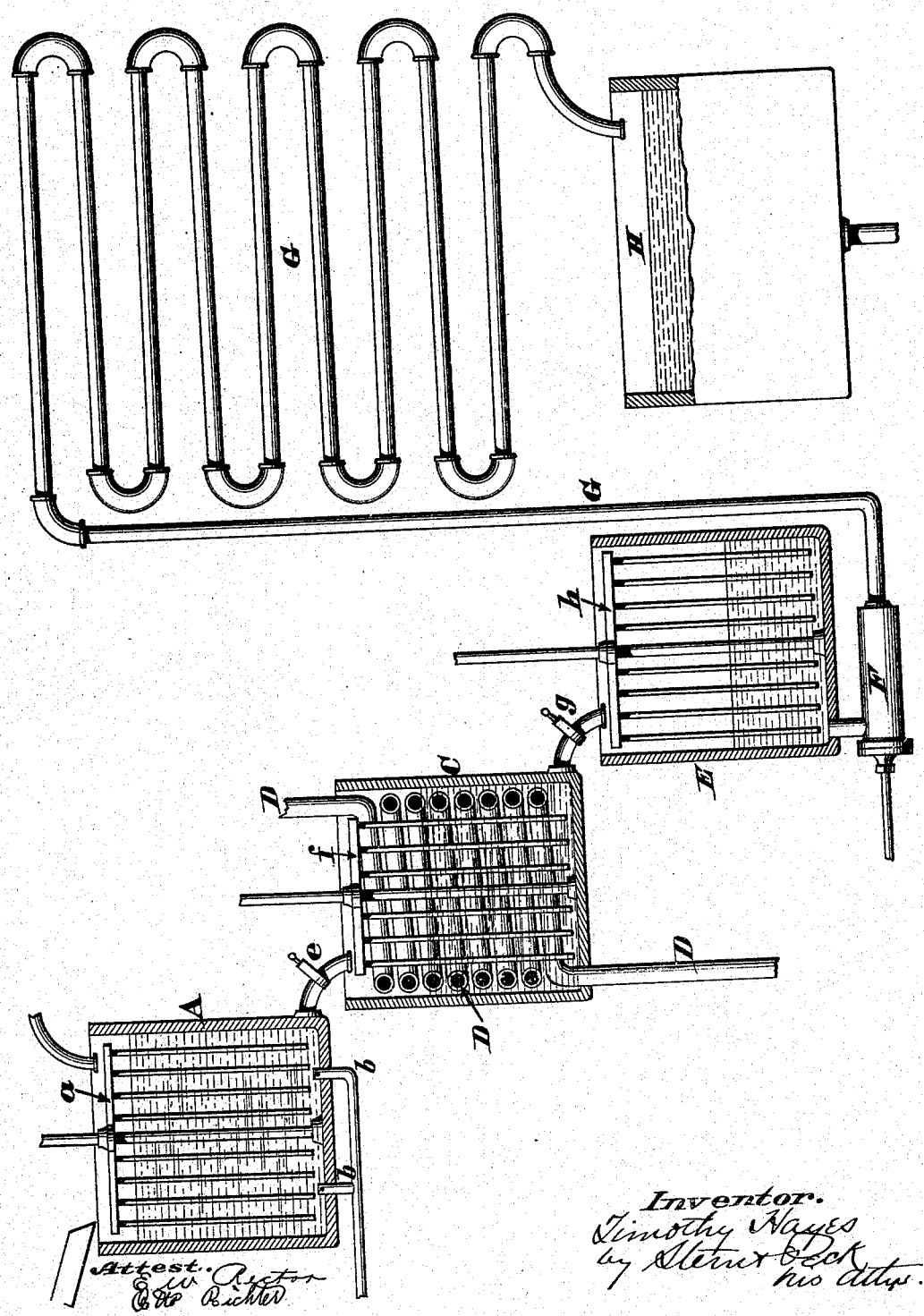

UNITED STATES PATENT OFFICE.

TIMOTHY HAYES, OF ANDERSON'S FERRY, OHIO.

PROCESS OF MAKING AND COOLING MASH.

SPECIFICATION forming part of Letters Patent No. 288,333, dated November 13, 1883.

Application filed August 25, 1882. (No model.)

*To all whom it may concern:*

Be it known that I, TIMOTHY HAYES, a citizen of the United States, residing at Anderson's Ferry, in the county of Hamilton and State of Ohio, have invented a certain new and useful Process of Making and Cooling Mash in the Distillation of Liquors, of which the following is a full, clear, and exact description, reference being had to the accompanying drawing, making part of this specification.

My invention has for its object the economy of time and fuel in the process of preparing wort for fermentation, and in the simplification of the apparatus for that purpose, whereby the scalding-tub may be kept in constant use without waiting for its contents to be cooled before being withdrawn therefrom.

The novelty consists in the process of first scalding the grain in a closed vessel or tank, under pressure, where whole grain is used, or in an open vessel where previously-ground grain is used; secondly, in withdrawing the contents from the scald-tub while hot and conducting the mash into a cooling-tank, so that the scald-tank can be at once refilled; thirdly, in conducting the partially-cooled mash into a receiving-vessel, from which it is pumped through any suitable cooling-coil into the fermenting vat or tub.

It also consists in the construction and arrangement of the apparatus employed, as will be herewith set forth and specifically claimed.

The drawing represents my improved apparatus in elevation and partly in section.

A is a sectional view of the scalding tank or tub, which in this instance is an open vessel provided with the usual or any suitable stirring-rakes, *a*, and having steam-pipes *b* opening into its bottom, to admit the steam for scalding. This vessel, of any material and construction, is designed to be used with previously-ground grain, and in it the usual process of scalding is effected. From the scalding-tub A extends an outlet-pipe, *e*, provided with a suitable cock or valve, and emptying into the cooling-vat C. This vat C is any suitable vessel, having a coil of pipe, D, around its inner wall, through which a stream of cold water or other cooling liquid is kept constantly flowing by gravity, it being received at the top and discharged at the bottom of the vessel. This vessel C is provided with stirrer-rakes *f*, of any proper construction, and has an outlet-pipe, *g*, at its bottom, opening into a third vessel, E, which I term the "receiving-vessel," and which is provided with stirring-rakes *h*, like the previous vessels. From the bottom of the vessel E a pipe extends into any suitable force-pump, F, provided with the usual valves, communicating with a cooling coil of pipes, G, which are of any suitable construction. This cooling-coil opens into the fermenting tub or vat H.

Now, the process employed with this apparatus is as follows: As soon as the mash is suitably scalded it is drawn off into the coolers C, where, when it is cooled to a sufficient degree, the malt is added and the scalding-vessel again refilled. Just before the second scald is completed the contents of the cooler C are drawn off into the receiver E, and at once are pumped through the final cooling-coil G into the fermenting-tub. While this pumping is going on the second scald is drawn off into the cooler C, and the scalding-vessel is again refilled, and so the operation continues without loss of time and with great economy of fuel.

Having thus fully described my invention, I claim—

The herein-described process of treating mash for fermentation, which consists in first scalding the mash and withdrawing it while hot into a separate cooling-vessel, where the malt is added, and where it remains while a succeeding scald is being prepared, in drawing the contents of the cooler into a receiver, to leave the cooler ready for the succeeding scald, and in pumping from the receiver scald, and in pumping from the receiver through a final cooling-coil into the fermenting-tub, substantially as described.

TIMOTHY HAYES.

Witnesses:
 EMMETT N. PARKER,
 GUS. A. MEYER.